United States Patent
Brock et al.

(10) Patent No.: US 11,562,159 B2
(45) Date of Patent: Jan. 24, 2023

(54) SYSTEM AND METHODS FOR SITUATIONAL ADAPTIVE IMAGE CAPTURE IMPROVEMENTS FOR BARCODE READING

(71) Applicant: ZEBRA TECHNOLOGIES CORPORATION, Lincolnshire, IL (US)

(72) Inventors: Christopher W. Brock, Manorville, NY (US); Edward Barkan, Miller Place, NY (US); Robert Sanders, St. James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 20 days.

(21) Appl. No.: 16/600,286

(22) Filed: Oct. 11, 2019

(65) Prior Publication Data

US 2021/0110123 A1    Apr. 15, 2021

(51) Int. Cl.
*G06K 7/10* (2006.01)
*G06K 7/14* (2006.01)

(52) U.S. Cl.
CPC ....... *G06K 7/10722* (2013.01); *G06K 7/1413* (2013.01)

(58) Field of Classification Search
None
See application file for complete search history.

(56) References Cited

U.S. PATENT DOCUMENTS

| | | | | |
|---|---|---|---|---|
| 8,146,822 B2* | 4/2012 | Drzymala | ............ | G06K 7/1096 235/462.41 |
| 8,408,468 B2* | 4/2013 | Van Horn | .......... | G06K 7/10574 235/462.25 |
| 9,298,963 B2* | 3/2016 | Negro | ................ | G06K 7/10881 |
| 2008/0029602 A1* | 2/2008 | Burian | ............... | G06K 7/10722 235/462.09 |
| 2008/0314985 A1* | 12/2008 | Kotlarsky | .......... | G06K 7/10821 235/462.2 |
| 2010/0147947 A1* | 6/2010 | Aker | .................... | G06K 7/1465 235/454 |
| 2013/0248602 A1* | 9/2013 | He | ...................... | G06K 7/10752 235/455 |
| 2015/0317503 A1* | 11/2015 | Powell | ............... | G06K 7/10881 235/455 |
| 2016/0188933 A1* | 6/2016 | Powell | ................... | G06K 7/089 235/462.42 |

* cited by examiner

*Primary Examiner* — Thien M Le
*Assistant Examiner* — April A Taylor
(74) *Attorney, Agent, or Firm* — Yuri Astvatsaturov

(57) ABSTRACT

A method is disclosed for adjusting imaging parameters of a bioptic barcode reader. The method includes capturing, by an imaging assembly, an initial image of a target object having an indicia thereon. The imaging assembly captures the initial image according to an initial imaging parameter. The method further includes attempting to decode the indicia from the initial image, and responsive to being unable to decode the indicia, detecting a substantially static presence of the target object within a field of view (FOV) of the imaging assembly. The method then includes, responsive to detecting the substantially static presence of the target object within the FOV, adjusting the initial imaging parameter to a subsequent imaging parameter, wherein the subsequent imaging parameter is different than the initial imaging parameter.

29 Claims, 5 Drawing Sheets

SYSTEM AND METHODS FOR SITUATIONAL ADAPTIVE IMAGE CAPTURE IMPROVEMENTS FOR BARCODE READING

BACKGROUND OF THE INVENTION

Barcode reading systems have been ubiquitous throughout the retail industry and others for decades to read barcodes featured on products. The imagers included in these systems are conventionally implemented to capture a barcode across the entire width of the barcode reading system platform. Thus, to ensure consistent barcode capture the imager is maintained at a particular depth of focus.

Traditional embodiments achieve this depth of focus by decreasing the imager's aperture. Unfortunately, decreasing the aperture decreases the amount of light the imager receives, which can be problematic for low contrast, difficult-to-read barcodes. Specifically, if the imager receives an insufficient amount of light, the resulting image may be of insufficient fidelity to decode the barcode featured therein.

While simply increasing the amount of illumination and/or exposure time may be attractive solutions, they too have drawbacks. For example, increasing the illumination may create a noticeable annoyance to a barcode reading system operator, and increasing the exposure time may not allow for the system to capture minimally blurred images as barcodes are swiped rapidly across the platform. Accordingly, there is a need for solutions that solve issues related to barcode reading systems that cannot adequately capture and/or decode low contrast barcodes.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
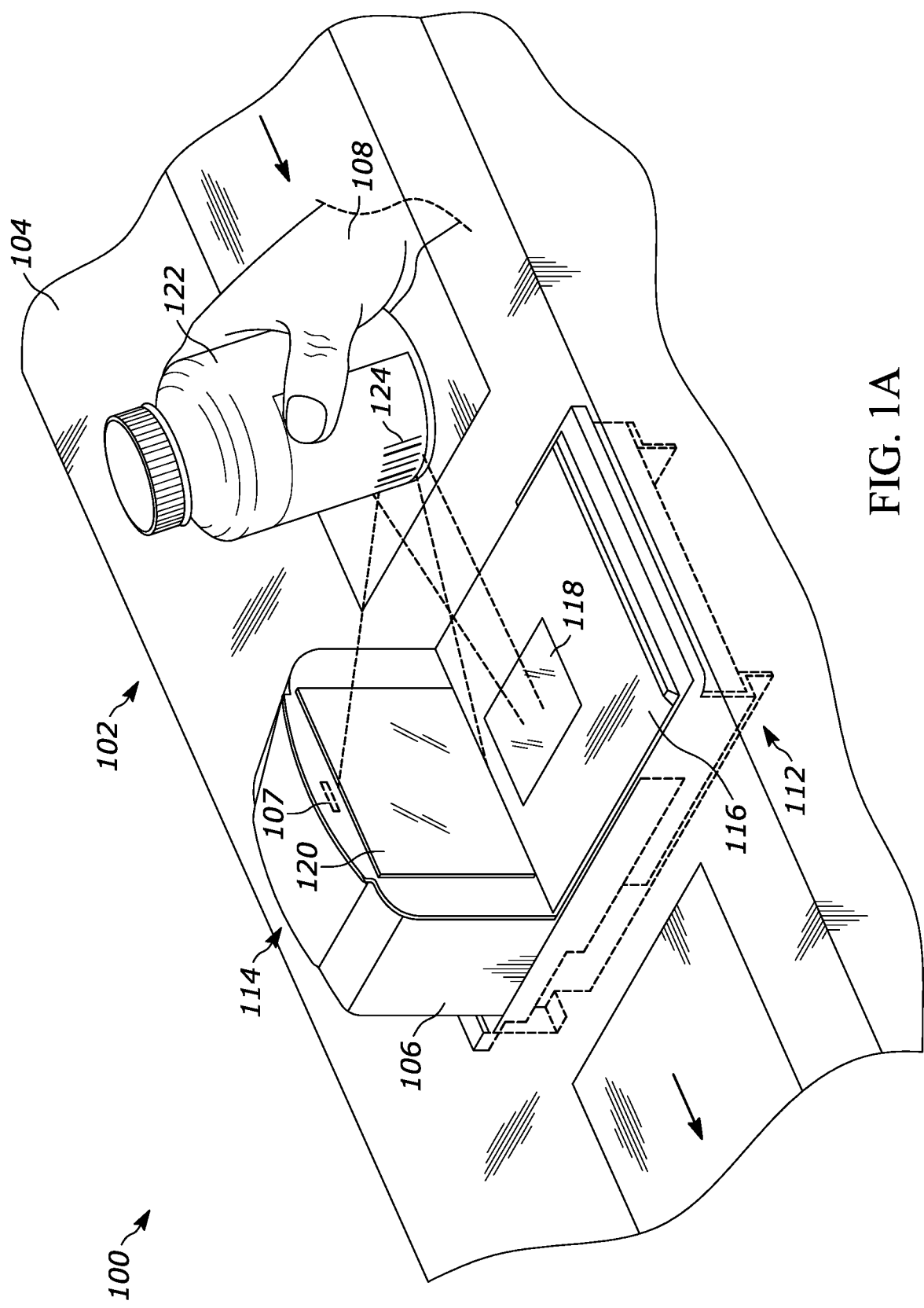
FIG. 1A illustrates a perspective view of an example checkout workstation in accordance with the teachings of this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In various embodiments of the present disclosure, a system, and related methods, are described for situational adaptive image capture improvements for barcode reading. The system, and related methods, of the present disclosure provide solutions where, e.g., a barcode reading system is required to capture high fidelity images of barcodes passing quickly across a system platform.

Traditional methods for barcode image capture maintain a particular depth of focus and a fixed exposure time in an attempt to capture as many scans as possible. Maintaining a static depth of focus and exposure time typically involves decreasing the system's aperture size, resulting in a decreased amount of received illumination. Unfortunately, increasing the illumination may cause an annoyance to the operator, and increasing the exposure time may reduce the number of decodable images as items are quickly swiped across the platform, so neither adjustment is traditionally implemented. Thus, for barcodes passed across the platform more quickly than normal, the system may not acquire an image suitable to decode the barcode.

To illustrate, store clerks or customers passing items across the system platform will typically swipe items quickly to expedite the check-out procedure. Should a clerk or customer swipe an item too quickly, the system may not capture an image of the item's barcode, and the item may not appear on the display with its corresponding price. In response, a clerk or customer may hold the item over the scanning platform to ensure the system properly scans the item. In any event, the clerk or customer may at least re-swipe the item at a slower speed than their initial swipe. However, despite the slower or static swipe, the system may remain unable to acquire a high fidelity image of the barcode due to the fixed depth of focus and exposure time.

Thus, the system and methods of the present disclosure seek to solve this problem with traditional barcode reading systems by situationally adjusting image parameters to improve barcode reading. Generally, the system and methods described herein perform an image parameter adjustment in response to being unable to decode an indicia of a target object in an initial image. The systems and methods described herein may also capture a subsequent image of the target object, and attempt to decode the indicia based on the adjusted image parameter.

In this way, the system and methods of the present disclosure overcome the limitations of traditional methods by adjusting the imaging parameters in response to being unable to decode the indicia. In other words, a fixed depth of focus and exposure time will no longer render the barcode reading system unable to capture decodable images of a target object's barcode because the system will automatically adjust imaging parameters to capture a decodable image for each barcode.

Performing an situationally specific image parameter adjustment in accordance with the methods of the present disclosure increases the accuracy of object identification performed by an imaging assembly, which may increase the efficacy of other corresponding functions. For example, an imaging assembly attempting to detect ticket-switching (i.e., replacing the label of a product with a less expensive product's label in an attempt to purchase the product at the less expensive product's price) will be increasingly capable of making that determination when the system is able to accurately decode the barcode affixed to the target object.

FIG. 1A illustrates a perspective view of a point-of-sale (POS) system 100 having a workstation 102 with a counter 104, a bi-optical (also referred to as "bi-optic") barcode reader 106 and an additional camera 107 at least partially positioned within the workstation 102. The camera 107 may be referred to as an imaging assembly and may be implemented as a color camera or a camera that is configured to obtain non-barcode data. The POS system 100 is often managed by a store employee such as a clerk 108. However, in other cases the POS system 100 may be a part of a so-called self-checkout lane where instead of a clerk, a customer is responsible for checking out his or her own products.

The barcode reader 106 includes a lower housing 112 and a raised housing 114. The lower housing 112 may be referred to as a first housing portion, the raised housing 114 may be referred to as a tower or a second housing portion, and the combination may be referred to as a housing. The lower housing 112 includes a top portion 116 with a first optically transmissive window 118 positioned therein along a generally horizontal plane relative to the overall configuration and placement of the barcode reader 106. In some embodiments, the top portion 116 may include a removable or a non-removable platter (e.g., a weighing platter). The top portion 116 can also be viewed as being positioned substantially parallel with the counter 104 surface. As set forth herein, the phrase "substantially parallel" means+/−10° of parallel and/or accounts for manufacturing tolerances. It's worth noting that while, in FIG. 1A, the counter 104 and the top portion 116 are illustrated as being about co-planar, that does not have to be the case for the platter and the counter 104 to be considered substantially parallel. In some instances, the counter 104 may be raised or lowered relative to the top surface of the top portion 116, where the top portion 116 is still viewed as being positioned substantially parallel with the counter 104 surface. The raised housing 114 is configured to extend above the top portion 116 and includes a second optically transmissive window 120 positioned in a generally upright plane relative to the top portion 116 and/or the first optically transmissive window 118. Note that references to "upright" include, but are not limited to, vertical. Thus, as an example, something that is upright may deviate from a vertical axis/plane by as much as 45 degrees.

In practice, a product 122, such as for example a bottle, is swiped past the barcode reader 106 such that a barcode 124 associated with the product 122 is digitally read through at least one of the first and second optically transmissive windows 118, 120. This is particularly done by positioning the product 122 within the fields of view (FsOV) of the digital imaging sensor(s) housed inside the barcode reader 106. Additionally, as the product 122 is swiped past the barcode reader 106, the camera 107 obtains image data of the product 122. The image data obtained by the camera 107 may have different uses. For example, the image data can be processed to verify that the product 122 scanned matches the barcode 124 and/or image data can be used to populate a database.

Figure 1B:
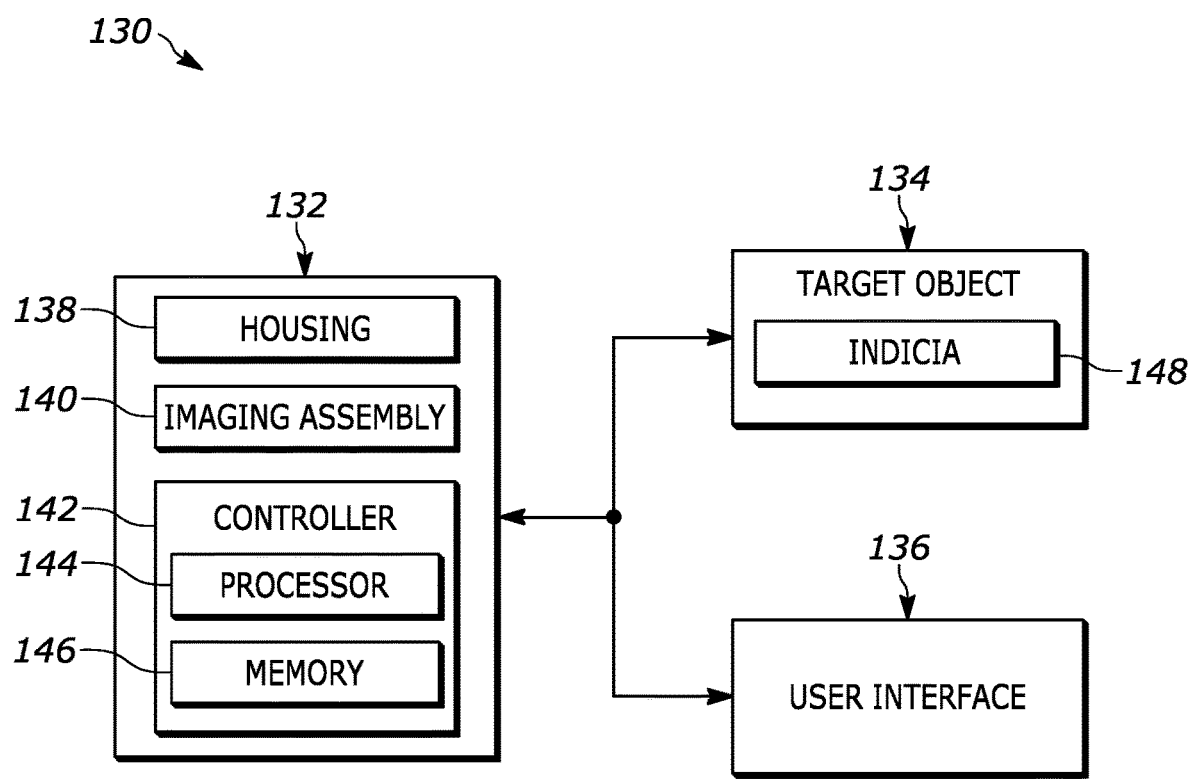
FIG. 1B is a block diagram representative of an operational embodiment of an example system, in accordance with various embodiments of the present disclosure.

FIG. 1B is a block diagram representative of an operational embodiment 130 of an example system 132, in accordance with various embodiments of the present disclosure. The example system 132 includes a housing 138, an imaging assembly 140, and a controller 142. The controller 142 contains a processor 144 and a memory 146 (although referenced herein as a "processor" and a "memory," it is to be understood that there may be one or more processors and/or one or more memories).

The operational embodiment 130 further includes a target object 134 and a user interface 136. The target object 134 contains an indicia 148, and in embodiments, the indicia 148 contains a barcode. The user interface 136 is communicatively coupled with the example system 132. For example, the target object 134 may be an item for purchase in a grocery store, the indicia 148 may be the barcode disposed on the target object 134, and the user interface 136 may be a display console at a POS station used by a clerk and/or customer to view recently detected items for purchase.

Figure 2:
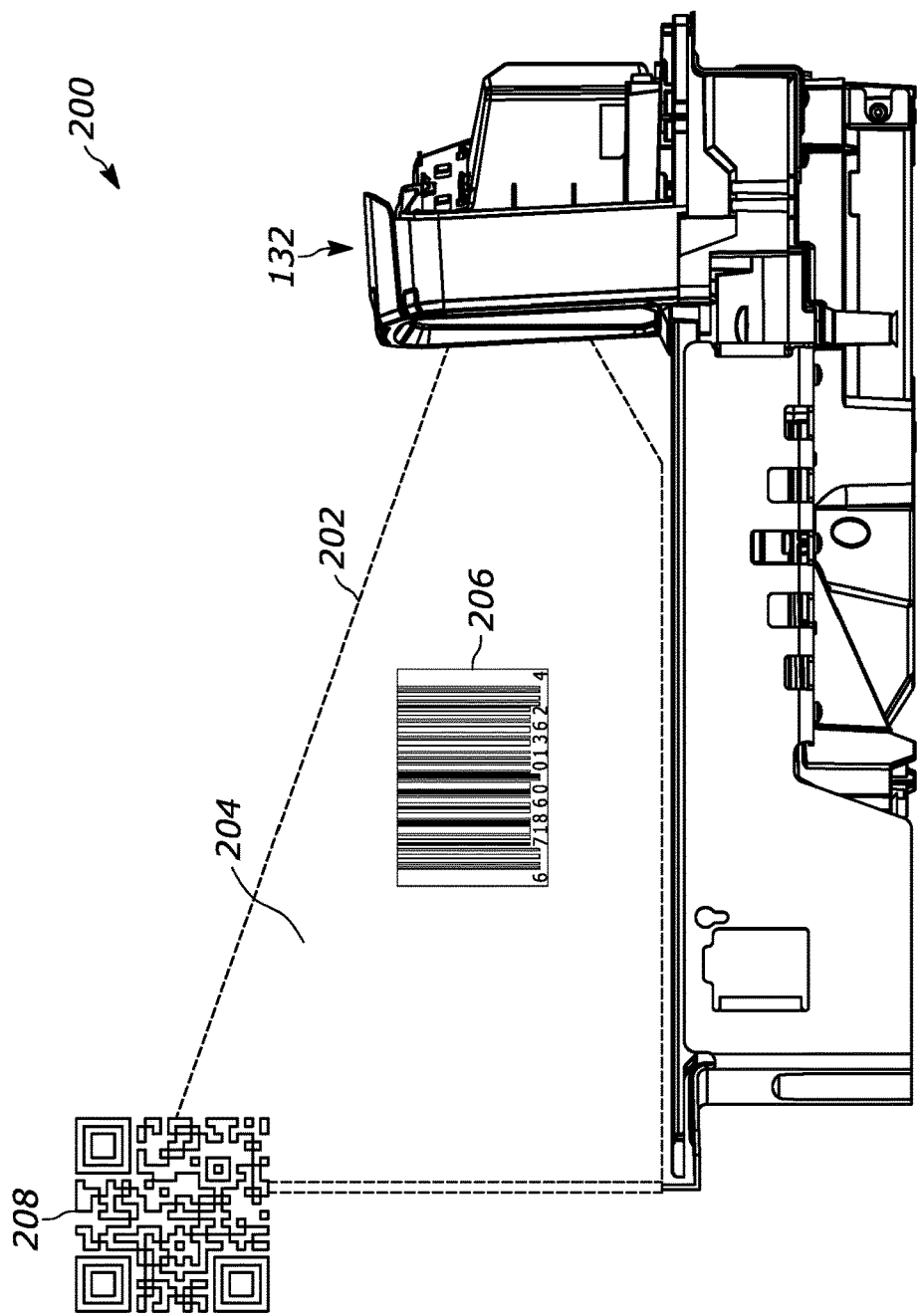
FIG. 2 is a profile view of the example system of FIG. 1B capturing images of various identification labels, in accordance with various embodiments disclosed herein.

The imaging assembly 140 is configured to capture an initial image of the target object 134. In reference to FIG. 2, the target object 134 is within the imaging assembly's 140 field of view (FOV) 202, wherein the initial image represents an environment 204 within the FOV 202. The imaging assembly 140 captures the initial image according to an initial imaging parameter. In embodiments, the initial imaging parameter includes one or more of (i) an imaging assembly gain, (ii) an illumination value, (iii) an exposure period, (iv) a pulse duration, or (v) a pulse overlap. In embodiments, the initial imaging parameter is adjustable via the user interface 136.

The controller 142 is communicatively coupled to the imaging assembly 140. The controller 142 is configured to transmit an image-capture signal to the imaging assembly 140. The image-capture signal causes the imaging assembly 140 to capture the initial image of the target object 134. For example, the example system 132 may detect the presence of a target object (e.g., target object 134) through any suitable means, such as a proximity sensor configured to detect the presence of a target object inside or within a vicinity of the imaging assembly's 140 FOV 204, or an input from the user interface 136. In embodiments, the controller 142 will receive a signal indicating the system's 132 detection of the target object 134 to prompt the controller 142 to generate and transmit the image-capture signal to the imaging assembly 140.

The instructions, when executed by the processor 144, will further cause the controller 142 to attempt to decode the indicia 148 from the initial image. Depending on the type of indicia 148 (e.g., barcode 206, quick response (QR) code 208, nutrition label 210, etc.) the controller 142 may attempt to decode the indicia 148 using one or more of several techniques, such as object recognition (OR), optical character recognition (OCR), and/or any other suitable technique. Moreover, it should be understood that the indicia 148 may be affixed to the target object 134, or may be associated with the target object 134.

In embodiments, the instructions, when executed by the processor 144, may further cause the controller 142 to determine an image quality of the initial image when attempting to decode the indicia 148 from the initial image. For example, the image quality may be indicative of one or more of (i) a contrast associated with at least a portion of the initial image or (ii) a brightness associated with at least a portion of the initial image. Thus, the controller 142 may determine a contrast and/or brightness of the initial image to make a determination of image parameters that may need adjustment should the controller 142 be unable to decode the indicia 148 from the initial image.

For example, assume the controller 142 transmits the image-capture signal to the imaging assembly 140, which in response, captures the initial image featuring the target object 134. The controller 142 then receives the initial image and attempts to decode the indicia 148 by analyzing the initial image to determine an image quality related to the contrast and brightness of the initial image. As a result of the determination, assume the controller 142 determines that the brightness of the indicia 148 in the initial image is very low. Thus, the controller 142 may also determine that, should the controller 142 be unable to decode the indicia 148 in the initial image, a subsequent image may be taken at a longer exposure time than the initial image to increase the brightness of the indicia 148 in the subsequent image and the controller's 142 ability to decode the indicia 148.

In embodiments, the instructions, when executed by the processor 144, further cause the controller 142 to generate a successful decode message in response to successfully decoding the indicia 148 from the initial image. For example, if the controller 142 successfully decodes the indicia 148 from the initial image, the controller 142 may generate a message indicating the successful decode for display on the user interface 136. The message may indicate the successful decode by presenting the user with a statement that the decode was successful, and/or the message may simply indicate the price of the target object 134 associated with the barcode.

However, should the controller 142 be unable to decode the indicia, the instructions, when executed by the processor 144, further cause the controller 142 to detect a substantially static presence of the target object 134 within the FOV 202 of the imaging assembly 140. The substantially static presence of the target object 134 within the FOV 202 may represent, for example, a clerk or customer holding the target object 134 in the FOV 202. To illustrate, the clerk or customer may have passed the target object 134 across the scanning platform (e.g., over the optically transmissive windows 118, 120), and not received a message or other indication that the system 132 was able to decode the indicia 148. Thus, the clerk or customer may hold and/or slowly swipe the target object 134 across the scanning platform in an attempt to allow the system 132 a better opportunity to decode the indicia 148. Hence, the controller 142 may detect clerk or customer holding and/or slowly swiping the target object 134 across the scanning platform, and may interpret these or other actions as a substantially static presence.

In embodiments, the instructions, when executed by the processor 144, further cause the controller 142 to detect the substantially static presence of the target object 134 within the FOV 202 of the imaging assembly 140 for greater than a threshold duration. The threshold duration may be any suitable duration, such as 2 seconds, 1 second, 0.5 seconds, etc., and may correspond to the duration a clerk or customer must keep the target object 134 within the FOV 202 before the controller 142 will adjust an imaging parameter and/or transmit a subsequent image-capture signal.

For example, after an initial failed attempt to decode the indicia 148 from the initial image, the clerk or customer may swipe the target object 134 across the scanning platform similarly to the initial swipe (e.g., similar swipe speed, angle, etc.). In response, the imaging assembly 140 may simply capture another image of the target object 134 using the initial imaging parameters. However, should the clerk or customer hold the target object 134 in the FOV 202 longer than the threshold duration, the controller 142 may interpret this action as a substantially static presence, and may for example, adjust an imaging parameter.

In embodiments, the imaging assembly 140 is further configured to capture a subsequent image of an environment 204 within the FOV 202 according to the initial imaging parameter. Additionally, the instructions, when executed by the processor 144, may further cause the controller 142 to transmit a subsequent image-capture signal to the imaging assembly 140. The subsequent image-capture signal may cause the imaging assembly 140 to capture the subsequent image in response to being unable to detect the substantially static presence of the target object 134 within the FOV 202.

To illustrate, assume the controller 142 was unable to decode the indicia 148 included in the initial image. In response, the controller 142 may attempt to detect the substantially static presence of the target object 134 within the FOV 202. Should the controller 142 not detect the substantially static presence of the target object 134 within the FOV 202, the system 132 may determine that a different target object may next pass through the FOV 202. Moreover, the system 132 may always use the initial imaging parameter when capturing initial images of target objects. In that case, the system 132 may further determine that the initial imaging parameter should be used to capture the subsequent image of the different target object.

In practice, this illustration may correspond to a clerk or customer who passes a first item (e.g., target object 134) across the scanning platform, but fails to acknowledge that the first item was not properly registered by the system 132 (e.g., the indicia 148 was not decoded). The clerk or customer may then attempt to pass a second item across the scanning platform without first successfully scanning the first item. Hence, the system 132 may not detect the substantially static presence of the first item. In response, the controller 142 may transmit the subsequent image-capture signal for the imaging assembly 140 to capture the subsequent image according to the initial imaging parameter.

However, should the controller 142 successfully detect the substantially static presence of the target object 134 within the FOV 202, the instructions, when executed by the processor 144, may cause the controller 142 to adjust the initial imaging parameter to a subsequent imaging parameter. The subsequent imaging parameter may be different than the initial imaging parameter. For example, the initial imaging parameter may correspond to an exposure length of 0.1 seconds. Once the controller 142 detects the substantially static presence of the target object 134 within the FOV 202, the controller 142 may adjust the exposure length from 0.1 seconds to 0.3 seconds. However, it is to be appreciated that the subsequent imaging parameter may be shorter, longer, or include any other relevant difference from the initial imaging parameter.

For example, and in embodiments, the instructions, when executed by the processor 144, further cause the controller 142 to adjust the initial imaging parameter to the subsequent imaging parameter based on the image quality. As discussed herein, the controller 142 may analyze the initial image to determine an image quality, such as contrast, brightness, etc., related to at least a portion of the initial image. Based on the determined image quality, the controller 142 may adjust the initial imaging parameter.

As an illustration, assume the controller 142 determines that the brightness of the indicia 148 in the initial image is very low. Assuming also that the controller 142 is unable to decode the indicia 148 in the initial image, the controller 142 may determine that any subsequent image of the target object 134 should be taken at a longer exposure time than the initial image. The longer exposure time should increase the brightness of the indicia 148 in the subsequent image, and consequently, the controller's 142 ability to decode the indicia 148. Hence, the controller 142 may adjust the initial imaging parameter to the subsequent imaging parameter (e.g., lengthen the exposure time of the imaging assembly 140).

In embodiments, the instructions, when executed by the processor 144, further cause the controller 142 to adjust the initial imaging parameter to the subsequent imaging parameter based on the threshold duration. As discussed herein, the controller 142 may detect the substantially static presence of the target object 134 within the FOV 202 for greater than a threshold duration. Thus, depending on the magnitude of the threshold duration, the controller 142 may adjust the initial imaging parameter accordingly. If the threshold duration is large relative to the initial exposure period, then the controller 142 may more drastically adjust the initial imaging parameter than if the threshold duration is approximately the same to the initial exposure period.

Practically speaking, the threshold duration may be any suitable duration sufficient to determine a substantially static presence of the target object 134 in the FOV 202. However, as an example, assume the initial imaging parameter is an initial exposure length for the imaging assembly 140. Further, assume the initial exposure length for the imaging assembly 140 is 0.1 seconds, and assume the threshold duration is 2 seconds. Should the controller 142 be unable to decode the indicia 148 in the initial image, assume also that the controller 142 detects the substantially static presence of the target object 134 in the FOV 202 because the user (e.g., clerk, customer, etc.) held, slowly waived, or in some other suitable fashion placed the target object 134 in the FOV 202 for greater than the threshold duration. At this point, the controller 142 may determine that because the target object 134 was present in the FOV 202 for a duration significantly longer than the initial exposure period (e.g., the threshold duration of 2 seconds), that a substantial change to the initial exposure period is justified. Correspondingly, the controller 142 may adjust the initial imaging parameter (e.g., initial exposure period) from 0.1 seconds to 0.5 seconds to ensure the imaging assembly 140 has sufficient time to capture a subsequent image from which the controller 142 may successfully decode the indicia 148.

In embodiments, the instructions, when executed by the processor 144, may further cause the controller 142 to transmit a subsequent image-capture signal to the imaging assembly 140. The subsequent image-capture signal will cause the imaging assembly 140 to capture the subsequent image. Moreover, the controller 142 will attempt to decode the indicia 148 from the subsequent image.

Generally speaking, once the controller 142 adjusts the initial imaging parameter to the subsequent imaging parameter, the imaging assembly 140 will capture a subsequent image of the target object 134 that features different image qualities than the initial image. For example, the controller 142 may have adjusted (e.g., lengthened) the exposure length of the imaging assembly 140 when capturing the subsequent image. In that case, the subsequent image of the target object 134 will likely feature a brighter image with a higher degree of contrast. Thus, the indicia 148 will be more readily identified, and the controller 142 will have a higher likelihood of successfully decoding the indicia 148.

It is to be understood that the initial imaging parameter and the subsequent imaging parameter may be any suitable imaging parameter. For example, and as mentioned herein, the imaging parameters may be an exposure period, an illumination value, a camera aperture size, a white balance compensation, an imaging assembly 140 gain, a pulse duration, a pulse overlap, any other suitable imaging parameter, and any combination thereof. Additionally, it should be understood that while the example system 132 is described and depicted as a bioptic barcode reader, in reference to FIGS. 1A-2, the systems and methods described herein are applicable to any other barcode readers whether stationary or handheld.

Figure 3:
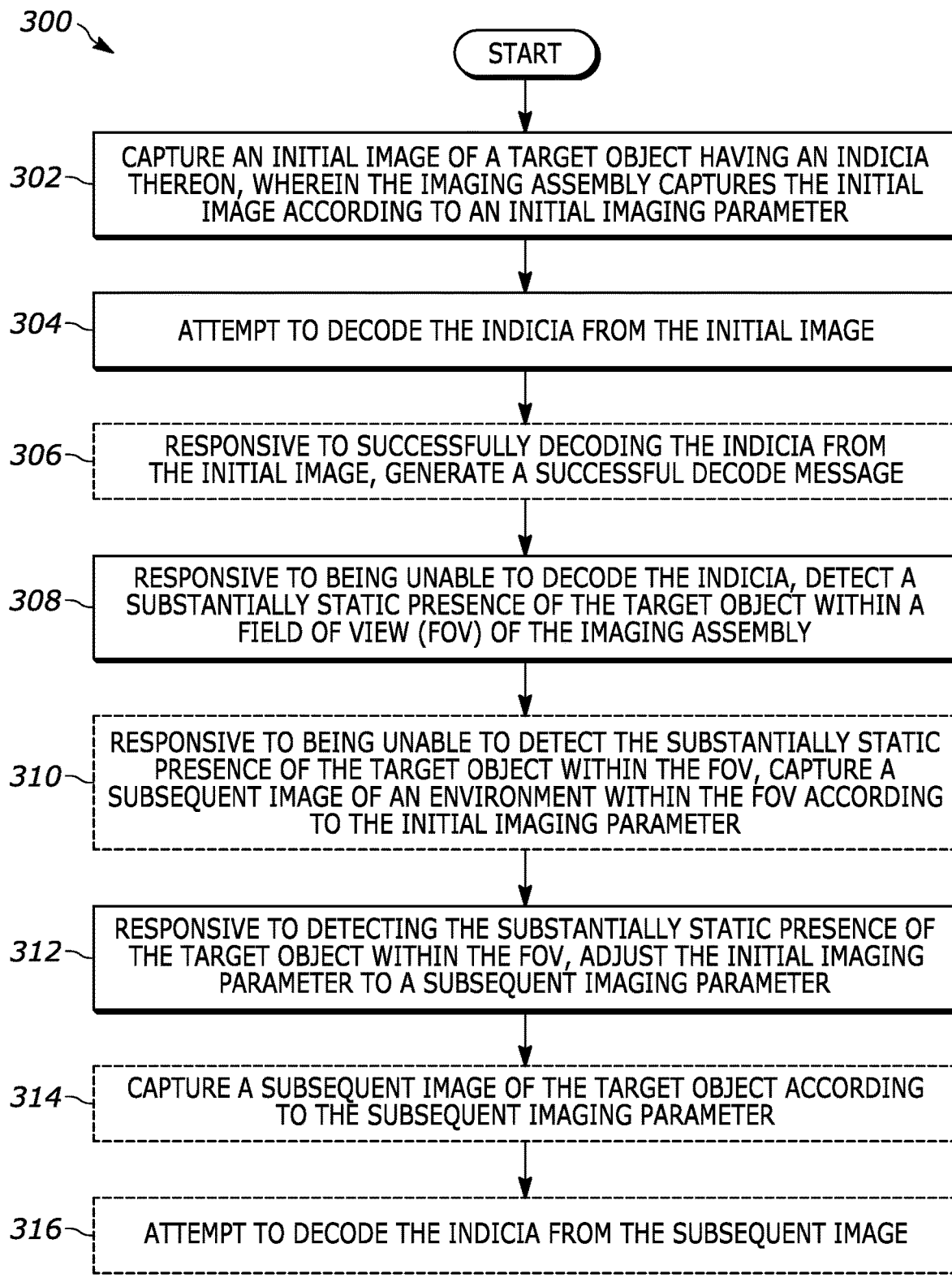
FIG. 3 illustrates a method for adjusting imaging parameters of a bioptic barcode reader, in accordance with various embodiments disclosed herein.

FIG. 3 illustrates a method 300 for adjusting imaging parameters of a bioptic barcode reader, in accordance with various embodiments disclosed herein. The method 300 begins at block 302 where, for example, an imaging assembly (e.g., imaging assembly 140) captures an initial image of a target object 142 having an indicia 148 thereon. The imaging assembly 140 captures the initial image according to an initial imaging parameter.

In embodiments, and as discussed herein, the initial imaging parameter include one or more of (i) an imaging assembly gain, (ii) an illumination value, (iii) an exposure period, (iv) a pulse duration, (v) a pulse overlap, (vi) a camera aperture size, (vii) a white balance compensation, any other suitable imaging parameter, and any combination thereof. Moreover, in embodiments, the indicia 148 in the target object 134 contains a barcode. It should be understood that the indicia 148 may contain any suitable indication, such as a barcode 206, QR code 208, nutrition facts label 210, and/or any other indication or combination thereof.

In embodiments, the initial imaging parameter is adjustable via the user interface 136. For example, a user (e.g., clerk, customer, etc.) of a bioptic barcode reader may wish to adjust the initial imaging parameter to increase their ability to successfully scan items at a POS station. Thus, the user may interact with the user interface 136 to select and adjust the initial imaging parameter. The user may, for example, increase the exposure period of the imaging assembly 140, increase the illumination provided during the exposure period, or any other suitable adjustment.

The method 300 continues at block 304 by attempting to decode the indicia 148 from the initial image. Block 304 may be performed by, for example, the controller 142. The controller 142 may implement one or more decoding techniques, such as OR, OCR, and/or any other suitable technique or combination thereof.

In embodiments, attempting to decode the indicia 148 further includes determining an image quality of the initial image. For example, the image quality may be indicative of one or more of (i) a contrast associated with at least a portion of the initial image or (ii) a brightness associated with at least a portion of the initial image. Thus, the image quality may indicate image parameters needing adjustment (e.g., exposure period, illumination value, etc.) should the controller 142 or other suitable processor be unable to decode the indicia 148 from the initial image.

The method 300 continues at optional block 306 by generating a successful decode message in response to successfully decoding the indicia 148 from the initial image. For example, the successful decode message may be displayed on the user interface 136, and may indicate the successful decode through text, images, graphics, video, audio, and/or any other suitable indication or combination thereof. As a practical example, a successful decode may result in the user interface 136 displaying the price associated with the target object 134. Optional block 306 may be performed by, for example, the controller 142.

The method 300 continues as block 308 by detecting a substantially static presence of the target object 134 within the FOV 202 of the imaging assembly 140 in response to being unable to decode the indicia 148. As discussed herein, the substantially static presence may represent a user (e.g., clerk, customer, etc.) holding, slowly waiving, or in some other suitable fashion placing the target object 134 in the FOV 202 for a certain duration. The duration defining the substantially static presence may be any suitable duration, and may be pre-programmed into the system 132 memory 146 or defined/adjusted by a user via the user interface 136. Block 308 may be performed by, for example, the controller 142.

In embodiments, detecting the substantially static presence of the target object 134 within the FOV 202 of the imaging assembly 140 further comprises detecting the substantially static presence of the target object 134 within the FOV 202 of the imaging assembly 140 for greater than a threshold duration.

The method 300 continues at optional block 310 by capturing a subsequent image of an environment 204 within the FOV 202 according to the initial imaging parameter in response to being unable to detect the substantially static presence of the target object 134 within the FOV 202. Optional block 310 may be performed by, for example, the imaging assembly 140. As discussed herein, capturing the subsequent image of the environment 204 according to the initial imaging parameter may take place in response to the system 132 determining that a different target object will be the next item to pass within the FOV 202 instead of the target object 134 captured in the initial image. However, in embodiments, the system 132 may also make a determination that the initial imaging parameter needs to be changed before any subsequent images are captured (e.g., adjust the initial imaging parameter for all initial images of target objects). In other words, the system 132 may contain a pre-programmed initial image threshold defining the number of initial images the controller 142 may analyze without successfully decoding the indicia 148 after which the system 132 will adjust the initial imaging parameter for all subsequent initial images.

For example, assume the system 132 (e.g., the controller 142) is unable to decode 5 different indicia included in 5 consecutive initial images of 5 different target objects. In response, the controller 142 may determine that an initial imaging parameter should be changed for all subsequent initial images to increase the overall system 132 performance. Hence, the controller 142 may, for example, increase the exposure period for all subsequent initial images.

The method continues at block 312 by adjusting the initial imaging parameter to a subsequent imaging parameter in response to detecting the substantially static presence of the target object 134 within the FOV 202. The subsequent imaging parameter is different than the initial imaging parameter, and as discussed above, may be larger, smaller, or any other suitable difference from the initial imaging parameter. Block 312 may be performed by, for example, the controller 142. In embodiments, adjusting the initial imaging parameter to a subsequent imaging parameter is based on the threshold duration.

In embodiments, the subsequent imaging parameter is determined based on the image quality. As discussed herein, the image quality may represent, for example, the contrast and/or brightness of at least a portion of the initial image. The image quality may also be an overall indication of the quality of the initial image, expressed as a quality score, index, percentage, alphanumeric character, and/or in any other suitable fashion or combination thereof. The controller 142 may transmit the image quality to the user interface 136 for display to inform a user of the initial image quality and whether a subsequent image should be captured.

In addition, the controller 142 may transmit recommended actions to the user based on the image quality. For example, if the contrast of the indicia 148 was very low in the initial image, the controller 142 may transmit a recommendation suggesting that the user angle the target object 134 more towards the imaging assembly 140 to increase the contrast produced by the illumination.

The method continues at optional block 314 by capturing a subsequent image of the target object 134 according to the subsequent imaging parameter. Optional block 314 may be performed by, for example, the imaging assembly 140.

The method continues as optional block 316 by attempting to decode the indicia from the subsequent image. Block 316 may be performed by, for example, the controller 142. In embodiments, the controller 142 may determine that a different decoding technique should be attempted when attempting to decode the subsequent image. For example, the controller 142 may attempt to decode the initial image using OR, but the user did not orient the target object 134 adequately for the controller 142 to decode the indicia 148. Thus, the distorted representation of the indicia 148 in the initial image due to improper orientation may have resulted in the controller 142 applying an inappropriate decoding technique for the indicia 148. Consequently, the user may re-orient the target object 134 to appropriately face the imaging assembly 140, the imaging assembly 140 may capture the subsequent image, and the controller 142 may attempt to decode the indicia 148 from the subsequent image. The controller 142 may then determine that the indicia should be decoded using OCR instead of OR, and may thus successfully decode the indicia 148.

Figure 4:
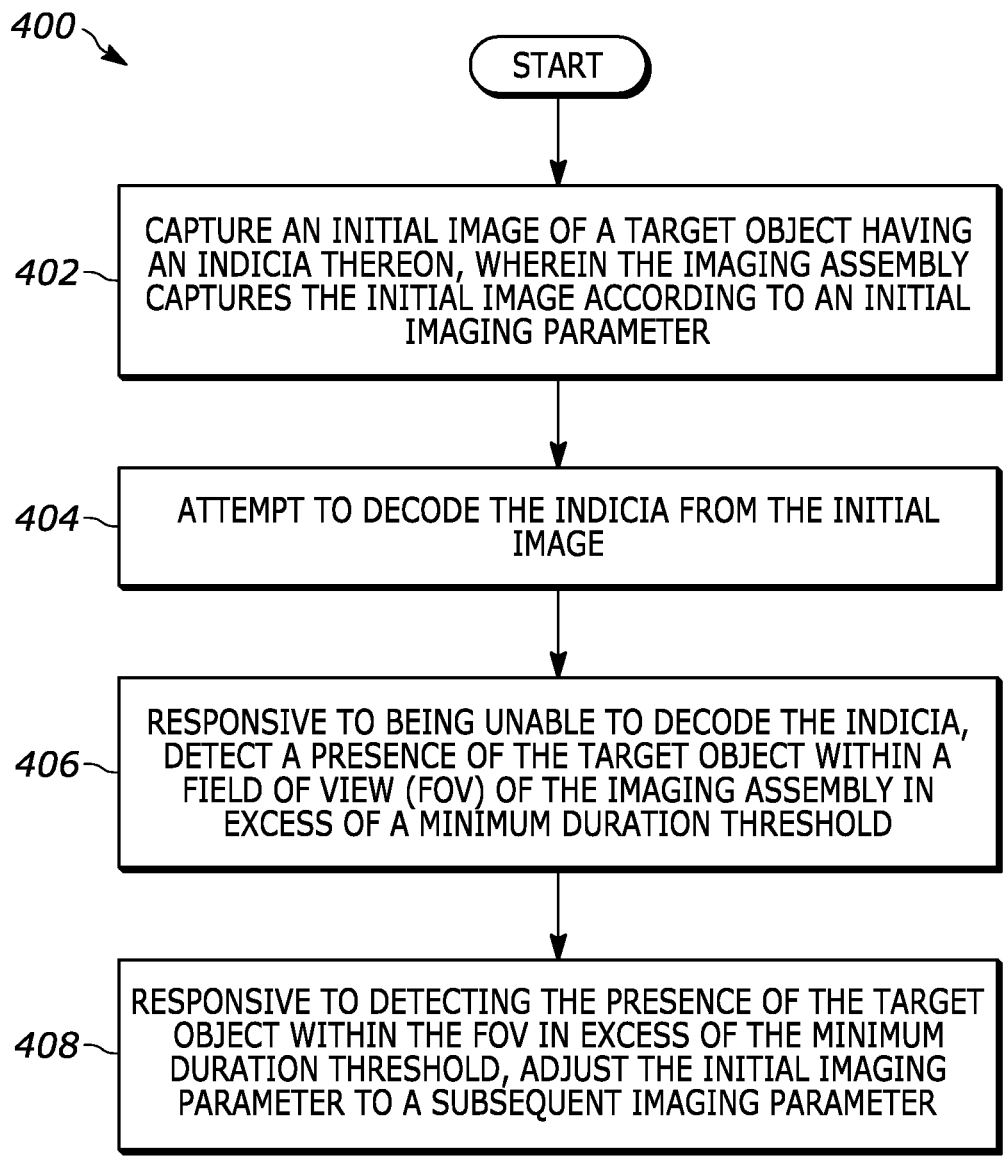
FIG. 4 illustrates another method for adjusting imaging parameters of a bioptic barcode reader, in accordance with various embodiments disclosed herein.

FIG. 4 illustrates another method 400 for adjusting imaging parameters of a bioptic barcode reader, in accordance with various embodiments disclosed herein. The method 400 begins at block 402, where, for example, an imaging assembly (e.g., imaging assembly 140) captures an initial image of a target object (e.g., target object 134) having an indicia (e.g., indicia 148) thereon. The imaging assembly 140 captures the initial image according to an initial imaging parameter.

The method 400 continues at block 404 by attempting to decode the indicia 148 from the initial image. Block 404 may be performed by, for example, the controller 142.

The method 400 continues at block 406 by detecting a presence of the target object 134 within a FOV (e.g., FOV 202) of the imaging assembly 140 in excess of a minimum duration threshold in response to being unable to decode the indicia 148. For example, a user may initially hold a target object 134 in the FOV 202 without swiping or moving the target object 134 outside of the FOV 202. Regardless, the imaging assembly 140 may still capture the initial image according to the initial imaging parameter, wherein the controller 142 may still attempt to decode the indicia 148 from the initial image. However, should the controller 142 be unable to decode the indicia from the initial image and the target object 134 has remained within the FOV 202 beyond the minimum duration threshold, the method 400 may proceed to block 408. Block 406 may be performed by, for example, the controller 142.

The method 400 continues at block 408 by adjusting the initial imaging parameter to a subsequent imaging parameter in response to detecting the presence of the target object 134 within the FOV 202 in excess of the minimum duration threshold. The minimum duration threshold may be any suitable duration, such as 2 seconds, 1 second, 0.5 seconds, etc., and may correspond to the duration a clerk or customer must keep the target object 134 within the FOV 202 before the controller 142 will adjust the initial imaging parameter and/or transmit a subsequent image-capture signal. Block 408 may be performed by, for example, the controller 142.

For example, after an initial failed attempt to decode the indicia 148 from the initial image, the clerk or customer may swipe the target object 134 across the scanning platform similarly to the initial swipe (e.g., similar swipe speed, angle, etc.). In response, the imaging assembly 140 may simply capture another image of the target object 134 using the initial imaging parameters. However, should the clerk or customer hold the target object 134 in the FOV 202 longer than the minimum duration threshold, the controller 142 may for example, adjust the initial imaging parameter.

It should be understood that, for any of the methods disclosed herein, the steps described may be performed in any order, or repeated any number of times to achieve a desired result. Moreover, the steps described for each method may be performed by at least one component of the example system 132.

The data or information captured from imaging assembly 140 may be transmitted to POS stations (including, e.g., user interface 136), servers, or other processing devices for a variety of purposes including, e.g., product purchases, data storage, inventory purposes, etc. Example systems 100, 132 may include a cabling interface for transmission of such data or information. In various embodiments, example systems 100, 132 may support several data transmission interfaces including, for example, USB, Standard RS-232, IBM 468X/469X, Simple Serial Interface (SSI), or other similar data transmission interfaces standards.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for adjusting imaging parameters of a bioptic barcode reader, the method comprising:
   capturing, by an imaging assembly, an initial image of a target object having an indicia thereon, wherein the imaging assembly captures the initial image according to an initial imaging parameter;
   attempting to decode the indicia from the initial image;
   responsive to being unable to decode the indicia, detecting a substantially static presence of the target object within a field of view (FOV) of the imaging assembly; and
   responsive to detecting the substantially static presence of the target object within the FOV, adjusting the initial imaging parameter to a subsequent imaging parameter, wherein the subsequent imaging parameter is different than the initial imaging parameter,
   wherein the initial imaging parameter includes one or more of (i) an imaging assembly gain, (ii) an illumination value, (iii) an exposure period, (iv) a pulse duration, or (v) a pulse overlap.

2. The method of claim 1, further comprising:
   capturing, by the imaging assembly, a subsequent image of the target object according to the subsequent imaging parameter; and
   attempting to decode the indicia from the subsequent image.

3. The method of claim 1, further comprising:
   responsive to successfully decoding the indicia from the initial image, generating a successful decode message; and
   responsive to being unable to detect the substantially static presence of the target object within the FOV, capturing, by the imaging assembly, a subsequent image of an environment within the FOV according to the initial imaging parameter.

4. The method of claim 1, wherein attempting to decode the indicia further includes determining an image quality of the initial image.

5. The method of claim 4, wherein the subsequent imaging parameter is determined based on the image quality.

6. The method of claim 4, wherein the image quality of the initial image is indicative of one or more of (i) a contrast associated with at least a portion of the initial image or (ii) a brightness associated with at least a portion of the initial image.

7. The method of claim 1, wherein detecting the substantially static presence of the target object within the FOV of the imaging assembly further comprises detecting the substantially static presence of the target object within the FOV of the imaging assembly for greater than a threshold duration.

8. The method of claim 7, wherein adjusting the initial imaging parameter to the subsequent imaging parameter is based on the threshold duration.

9. The method of claim 1, wherein the initial imaging parameter is adjustable via a user interface, and the indicia in the target object contains a barcode.

10. An apparatus for adjusting imaging parameters of a bioptic barcode reader, comprising:
    a housing;
    an imaging assembly configured to capture an initial image of a target object having an indicia thereon, wherein the target object is within a field of view (FOV) of the imaging assembly, and wherein the imaging assembly captures the initial image according to an initial imaging parameter; and
    a controller communicatively coupled to the imaging assembly, the controller having a processor and a memory, the memory storing instructions that, when executed by the processor, cause the controller to:
       transmit an image-capture signal to the imaging assembly, the image-capture signal causing the imaging assembly to capture the initial image of the target object,
       attempt to decode the indicia from the initial image,
       responsive to being unable to decode the indicia, detect a substantially static presence of the target object within the FOV of the imaging assembly, and
       responsive to detecting the substantially static presence of the target object within the FOV, adjust the initial imaging parameter to a subsequent imaging parameter, wherein the subsequent imaging parameter is different than the initial imaging parameter,
    wherein the initial imaging parameter includes one or more of (i) an imaging assembly gain, (ii) an illumination value, (iii) an exposure period, (iv) a pulse duration, or (v) a pulse overlap.

11. The apparatus of claim 10, wherein the imaging assembly is further configured to capture a subsequent image of the target object according to the subsequent imaging parameter; and
    wherein the instructions, when executed by the processor, further cause the controller to:
       transmit a subsequent image-capture signal to the imaging assembly, the subsequent image-capture signal causing the imaging assembly to capture the subsequent image, and
       attempt to decode the indicia from the subsequent image.

12. The apparatus of claim 10, wherein the imaging assembly is further configured to capture a subsequent image of an environment within the FOV according to the initial imaging parameter; and
    wherein the instructions, when executed by the processor, further cause the controller to:
       responsive to successfully decoding the indicia from the initial image, generate a successful decode message, and
       responsive to being unable to detect the substantially static presence of the target object within the FOV, transmit a subsequent image-capture signal to the imaging assembly, the subsequent image-capture signal causing the imaging assembly to capture the subsequent image.

13. The apparatus of claim 10, wherein the instructions, when executed by the processor, further cause the controller to determine an image quality of the initial image when attempting to decode the indicia from the initial image.

14. The apparatus of claim 13, wherein the instructions, when executed by the processor, further cause the controller to adjust the initial imaging parameter to the subsequent imaging parameter based on the image quality.

15. The apparatus of claim 13, wherein the image quality of the initial image is indicative of one or more of (i) a contrast associated with at least a portion of the initial image or (ii) a brightness associated with at least a portion of the initial image.

16. The apparatus of claim 10, wherein the instructions, when executed by the processor, further cause the controller to detect the substantially static presence of the target object within the FOV of the imaging assembly for greater than a threshold duration.

17. The apparatus of claim 16, wherein the instructions, when executed by the processor, further cause the controller to adjust the initial imaging parameter to the subsequent imaging parameter based on the threshold duration.

18. The apparatus of claim 10, further comprising a user interface, wherein the initial imaging parameter is adjustable via the user interface, and wherein the indicia in the target object contains a barcode.

19. A system for adjusting imaging parameters of a bioptic barcode reader, comprising:
   a housing;
   an imaging assembly configured to capture an initial image of a target object having an indicia thereon, wherein the target object is within a field of view (FOV) of the imaging assembly, and wherein the imaging assembly captures the initial image according to an initial imaging parameter; and
   a controller communicatively coupled to the imaging assembly, the controller having a processor and a memory, the memory storing instructions that, when executed by the processor, cause the controller to:
      transmit an image-capture signal to the imaging assembly, the image-capture signal causing the imaging assembly to capture the initial image of the target object,
      attempt to decode the indicia from the initial image,
      responsive to being unable to decode the indicia, detect a presence of the target object within the FOV in excess of a minimum duration threshold, and
      responsive to detecting the presence of the target object within the FOV in excess of the minimum duration threshold, adjust the initial imaging parameter to a subsequent imaging parameter, wherein the subsequent imaging parameter is different than the initial imaging parameter.

20. The system of claim 19, wherein the imaging assembly is further configured to capture a subsequent image of the target object according to the subsequent imaging parameter; and
   wherein the instructions, when executed by the processor, further cause the controller to:
      transmit a subsequent image-capture signal to the imaging assembly, the subsequent image-capture signal causing the imaging assembly to capture the subsequent image, and
      attempt to decode the indicia from the subsequent image.

21. The system of claim 19, wherein the imaging assembly is further configured to capture a subsequent image of an environment within the FOV according to the initial imaging parameter; and
   wherein the instructions, when executed by the processor, further cause the controller to:
      responsive to successfully decoding the indicia from the initial image, generate a successful decode message, and
      responsive to being unable to detect the presence of the target object within the FOV in excess of the minimum duration threshold, transmit a subsequent image-capture signal to the imaging assembly, the subsequent image-capture signal causing the imaging assembly to capture the subsequent image.

22. The system of claim 19, wherein the instructions, when executed by the processor, further cause the controller to determine an image quality of the initial image when attempting to decode the indicia from the initial image.

23. The system of claim 22, wherein the instructions, when executed by the processor, further cause the controller to adjust the initial imaging parameter to the subsequent imaging parameter based on the image quality.

24. The system of claim 22, wherein the image quality of the initial image is indicative of one or more of (i) a contrast associated with at least a portion of the initial image or (ii) a brightness associated with at least a portion of the initial image.

25. The system of claim 19, wherein the minimum duration threshold is indicative of one or more of (i) a time duration or (ii) a frame number threshold.

26. The system of claim 25, wherein the instructions, when executed by the processor, further cause the controller to adjust the initial imaging parameter to the subsequent imaging parameter based on the minimum duration threshold.

27. The system of claim 19, wherein the minimum duration threshold is greater than or equal to one or more of (i) one-quarter of a second, (ii) one-half of a second, (iii) one second, or (iv) two seconds.

28. The system of claim 19, further comprising a user interface, wherein the initial imaging parameter is adjustable via the user interface, the initial imaging parameter includes one or more of (i) an imaging assembly gain, (ii) an illumination value, (iii) an exposure period, (iv) a pulse duration, or (v) a pulse overlap, and wherein the indicia in the target object contains a barcode.

29. A method for adjusting imaging parameters of a bioptic barcode reader, the method comprising:
   capturing, by an imaging assembly, an initial image of a target object having an indicia thereon, wherein the imaging assembly captures the initial image according to an initial imaging parameter;
   attempting to decode the indicia from the initial image;
   responsive to being unable to decode the indicia, detecting a presence of the target object within a field of view (FOV) of the imaging assembly in excess of a minimum duration threshold; and
   responsive to detecting the presence of the target object within the FOV in excess of the minimum duration threshold, adjusting the initial imaging parameter to a subsequent imaging parameter, wherein the subsequent imaging parameter is different than the initial imaging parameter.

* * * * *